United States Patent
Kubo

(10) Patent No.: US 7,813,001 B2
(45) Date of Patent: Oct. 12, 2010

(54) COLOR IMAGE PROCESSING METHOD, COLOR IMAGE PROCESSOR AND STORAGE MEDIUM

(75) Inventor: Masahiko Kubo, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1286 days.

(21) Appl. No.: 10/885,107

(22) Filed: Jul. 7, 2004

(65) Prior Publication Data

US 2005/0128491 A1 Jun. 16, 2005

(30) Foreign Application Priority Data

Dec. 15, 2003 (JP) .............................. 2003-417106

(51) Int. Cl.
- H04N 1/60 (2006.01)
- H04N 1/46 (2006.01)
- H04N 1/405 (2006.01)
- H04N 1/40 (2006.01)
- G06K 1/00 (2006.01)
- G06K 9/00 (2006.01)

(52) U.S. Cl. ..................... 358/1.9; 358/504; 358/515; 358/518; 358/523; 358/3.06; 358/3.28; 358/1.1; 382/162; 382/167; 382/100

(58) Field of Classification Search .................. 358/1.9, 358/3.2, 3.23, 3.05; 382/162, 167; 347/100, 347/15

See application file for complete search history.

(56) References Cited

U.S. PATENT DOCUMENTS

| | | | |
|---|---|---|---|
| 4,812,899 A | 3/1989 | Kueppers | |
| 6,571,010 B1 * | 5/2003 | Inoue | 382/162 |
| 6,637,851 B2 * | 10/2003 | Velde et al. | 347/15 |
| 6,886,932 B2 * | 5/2005 | Rudolph | 347/100 |

(Continued)

FOREIGN PATENT DOCUMENTS

JP 11-098375 4/1999

(Continued)

OTHER PUBLICATIONS

Kazumasa Murai, et al. "An Accurate Color Transformation Algorithm based on Flexible GCR (2) Accurate Printer Model by Neural Network." *Imaging Science and Technology Laboratory.* pp. 181-184.

(Continued)

*Primary Examiner*—Thierry L Pham
*Assistant Examiner*—Satwant K Singh
(74) *Attorney, Agent, or Firm*—Morgan, Lewis & Bockius LLP

(57) ABSTRACT

A color image processing method, which is adapted to convert a first color signal including a solid color signal to a second color signal including a solid color signal, includes: determining a device independent color signal on a color coordinate in a color system from the first color signal; determining a solid color signal of the second color signal having the minimum or substantially minimum color difference from the solid color signal of the first color signal; and determining a color signal other than the solid color signal of the second color signal to be calorimetrically equal to the device independent color signal from the device independent color signal and the solid color signal of the second color signal.

22 Claims, 7 Drawing Sheets

U.S. PATENT DOCUMENTS

| | | | | |
|---|---|---|---|---|
| 6,956,672 B1 * | 10/2005 | Huang et al. | ............ | 358/1.9 |
| 7,027,191 B1 * | 4/2006 | Steinhauer | ............ | 358/3.2 |
| 7,164,498 B2 * | 1/2007 | Van Bael | ............ | 358/1.9 |
| 7,196,823 B2 * | 3/2007 | Hagai et al. | ............ | 358/3.23 |
| 7,224,487 B2 * | 5/2007 | Gupta et al. | ............ | 358/3.05 |
| 7,227,990 B2 * | 6/2007 | Hirao | ............ | 382/167 |
| 7,286,267 B2 * | 10/2007 | Chang | ............ | 358/3.1 |
| 7,466,448 B2 * | 12/2008 | Yamamoto et al. | ............ | 358/1.9 |
| 7,715,042 B2 * | 5/2010 | Yoshizawa et al. | ............ | 358/1.8 |
| 2003/0169438 A1 * | 9/2003 | Velde et al. | ............ | 358/1.9 |
| 2005/0094169 A1 * | 5/2005 | Berns et al. | ............ | 358/1.9 |
| 2005/0094871 A1 * | 5/2005 | Berns et al. | ............ | 382/162 |
| 2006/0285742 A1 * | 12/2006 | Arai et al. | ............ | 382/162 |

FOREIGN PATENT DOCUMENTS

| | | |
|---|---|---|
| JP | 11-164163 | 6/1999 |
| JP | 2000-32284 | 1/2000 |
| JP | 2000-246874 | 9/2000 |
| JP | 2001-053976 | 2/2001 |
| JP | 2001-136401 | 5/2001 |
| JP | 2001-157074 | 6/2001 |
| JP | 2001-169131 | 6/2001 |
| JP | 2002-046302 | 2/2002 |

OTHER PUBLICATIONS

Davies-Swann Campey. Hiroshi Konno and Hiroshi Yamashita. *Nonlinear Programming*, Nikka Giren Publishing Company, 1978, pp. 284-287 & 354-355.

* cited by examiner

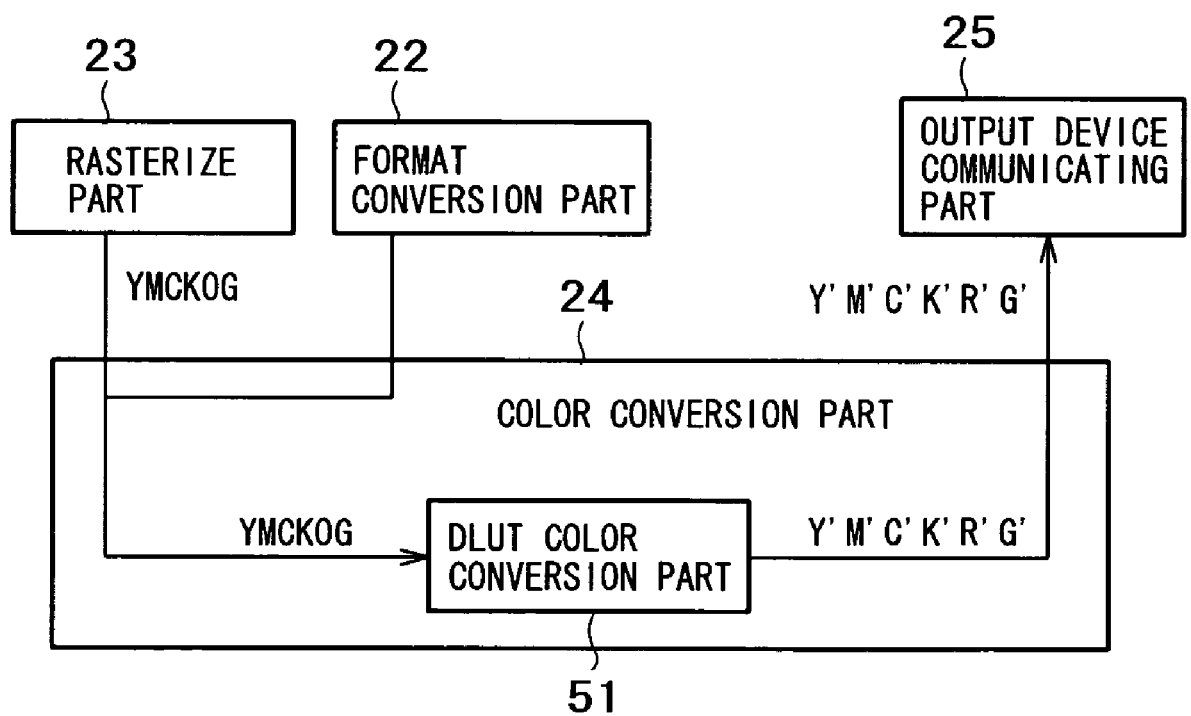

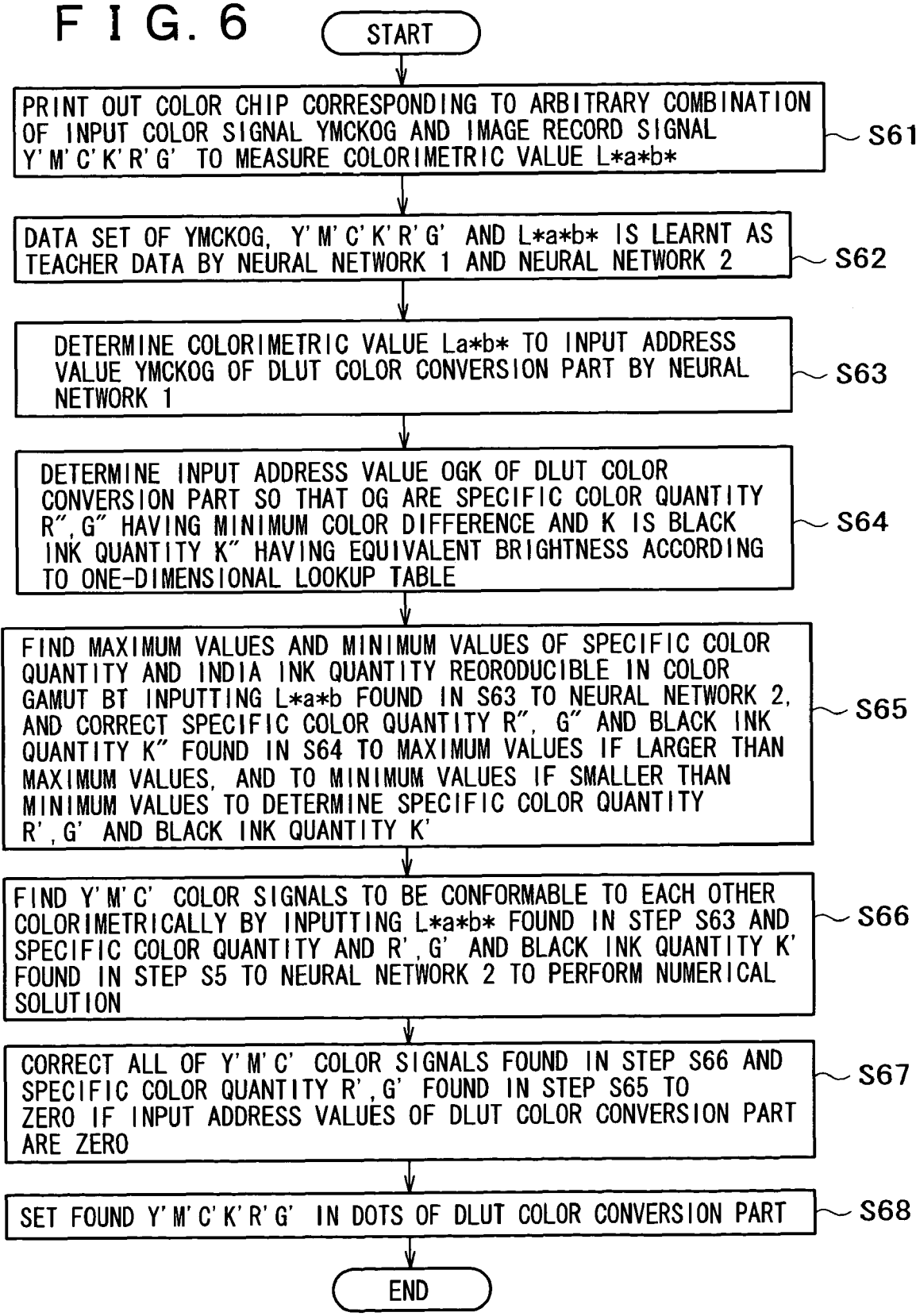

COLOR IMAGE PROCESSING METHOD, COLOR IMAGE PROCESSOR AND STORAGE MEDIUM

BACKGROUND OF THE INVENTION

1. Field of the Invention

This invention relates to a color image processing technique for converting an input color image signal to a color image record signal of a color printer and the like, and particularly to the technique for converting a color image signal including a solid color or further black ink to a color image record signal including a solid color or further black ink along with yellow, magenta, and cyan.

2. Description of the Related Arts

In the printing technology, as a technique for representing a vivid color not reproduced by four-color process printing using yellow (Y), magenta (M), cyan (C) and black ink (K), a solid color composed of primary color ink of red (R), green (G) and blue (B) or fluorescent ink is added to four colors YMCK to perform color reproduction. As a color sample of a solid color, PANTONE formula guides is known, and about solid colors of about 1000 types are defined.

In the printing machine, however, only eight colors at maximum can be printed at the same time, so the number of solid colors to be used is as small as no more than eight colors and there have been designers' demands toward increase in number of available solid colors. Further, in the case of changing the solid color in every impression, cleaning work for the printing machine is performed, resulting in the problem that solid color printing takes a great amount of man-hour in a printing site.

Further, in the workflow of printing, a manuscript of a natural picture has been sent to a printer by a digital camera. Since the sRGB color space, which is the color space of the digital camera, is wider than the color gamut of four-color YMCK process color printing, there have been strong demands towards enlargement of the color gamut of printing aiming at the faithful reproduction.

In order to cope with the above problems and requests, in the printing technology, a color reproduction method called HiFi color has been proposed, in which in addition to the four-color YMCK process color, at least one of solid colors RGB is added for color reproduction in five to seven colors so as to enlarge the color gamut. As the HiFi color printing, PANTONE hexachrome has been widely used, and in that printing, in addition to four colors YMCK, R-series orange (O) ink and G ink are added to perform color reproduction in six colors, whereby about 90% of the above PANTONE formula guide can be reproduced. This color reproduction method of HiFi color printing (hereinafter referred to as HiFi color) has been widely applied to an ink jet method and an electrophotographic color printer as well, so it is general as a technique for enlarging the color gamut.

On the other hand, with the recent development of computer technology, network technology and color printer technology, as for the prints for which an order has been placed from a printing office heretofore, an electronic printing original document is created by a computer in an office or at home, and in the case of a small number of copies, the prints are output by a color printer of the office or home, and in the case of a large number of copies, desk top publishing (hereinafter referred to as DTP), that is, sending of a manuscript to a printing office by an electronic document has been extensively carried on. In the case of the DTP, an object of an output device is printing, so it is general to create electronic print data on a computer with image record signals in printing. For example, in the case of the hexachrome printing described above, an electronic manuscript is represented by color signals of six colors YMCKOG, in which orange and green are added to four colors YMCK: yellow, magenta, cyan and black ink.

In the case of specifying the colors of the electronic manuscript using the image record signals in printing as described above, black ink is specified in characters, graphic forms and natural drawings from the respective different point of views by an editor creating the electronic manuscript. To be concrete, the characters and graphic forms are specified by black ink color only regardless of the density of the characters and fine lines in order to improve the visibility of the black characters and black fine lines. Further, it depends on the editor's intention of presentation whether the gray of the graphic form is represented by process black ink of yellow, magenta and cyan, or represented by the black ink color only.

On the other hand, in the natural images, the black ink is ordinarily generated through inking processing such as UCR (Under Color Replacement) and GCR (Gray Component Replacement) by photo retouch software or a scanner. At the time, it is usual that in an area having a low density, inking is not performed to secure the graininess and gradient, but in an area having a high density, inking is performed. When the inking amount is large, color reproduction is deteriorated. Accordingly, in the natural images, frequently the inking rate is set low.

As described above, the black ink specifying method varies with the characters, graphic forms and natural images. Accordingly, when they are output to a printer, the same black ink amount is attained in the input and output as the editor's intention, and in a manuscript, a part specified by the black ink color only is required to be output in the black ink color only.

Similarly to the black ink, the solid colors in the HiFi color printing are also specified in the characters, the graphic forms and natural drawings from the respective different points of view by an editor creating an electronic manuscript. To be concrete, it is frequent that as to the characters and graphic forms, red characters and red fine lines, which are represented by second color of yellow and magenta in ordinary process color printing, are specified by red only which is solid color regardless of the density of the character and fine line in order to prevent the deterioration of visibility due to color aberration. As to the red representation of a graphic form, it depends on an editor's intention for presentation whether the graphic form is represented by red of second color of yellow and magenta, red only which is solid color, or third color obtained by adding red as solid color to the second color of yellow and magenta.

Also in the case of using the solid color, in the natural drawings, generally UCR processing is performed by photo retouch software or scanner to generate a solid color from three primary color signals of YMC or RGB. At the time, in the process color printing, for example, in the reproduction of red represented by second color of yellow and magenta, in order to decrease the quantity of ink to reduce the printing cost, sometimes the UCR rate of the solid color is set higher so that the quantity of red as solid color is increased and the quantity of yellow and magenta is decreased so as to reproduce the red by combination of colors inclining toward first color. On the other hand, in some cases, the UCR ratio of the solid color is set lower so that the quantity of red as solid color is decreased and the quantity of yellow and magenta is increased to reduce the red by combination of colors inclining toward second color and third color, thereby producing depth in a tone of color and gradation. As described above, as to the natural drawings, the solid color specifying method depends on the editor's intention of presentation and cost request.

As described above, while the solid color is also different in specifying method between the characters, the graphic forms and the natural drawings similarly to the black ink, in the case of outputting to the printer, the same solid color is requested both in the input and in the output as the editor's intention.

In the case of printing a large number of copies, printing is performed by color reproduction method corresponding to the color signal specified by the electronic document, whereby it is not necessary to conduct color conversion processing for the color signal on the electronic document. In the case of outputting a small number of copies by a color printer, however, the color reproducibility is largely difference between press and color printer, so it is necessary to perform color conversion processing for converting input color signals including a solid color and black ink of HiFi color printing to image record signals including a solid color and black ink of the color printer. In the case where the color reproduction method specified by the electronic manuscript is HiFi color printing such as hexachrome printing, also in the color printer, the color gamut equivalent to that of the HiFi color printing is required. Therefore, it is necessary to output in print by the color printer adapted to perform color reproduction according to the image record signals including a solid color and black ink similar to those of the HiFi color printing as input signals. In the color printer, however, the coloring materials of solid colors having the quite same characteristics as those of printing cannot be always used, so it is necessary to conduct color conversion processing to the image record signals including a solid color and black ink used in the color printer. As the related art of color conversion processing for such HiFi color, the following technique has been proposed.

At present in the color management system (hereinafter referred to as CMS) based on the specifications proposed by International Consortium (hereinafter referred to as ICC) widely spread as the industry standard, after color signal conversion from the machine dependent color space including a solid color and black ink of YMCKOG color signals serving as input color signals to color signals of machine independent L*a*b* or XYZ color space, the color signals are converted to image record signals including a solid color and black ink of the machine dependent color space of the color printer. When color conversion processing is thus conducted, the input color signals and the output image record signals are of the same in the machine independent color signal, colorimetric color reproduction can be ensured so that high-accuracy color conversion can be implemented. As this type of CMS, Color Sync carried by Mac (registered trade mark) OS of Apple Computer Corp. and ICM carried by Windows (registered trade mark) of Microsoft Corp. are typical.

Conversion from the input color signals including a solid color and black ink to the device independent color signals is publicly known, so in the color conversion processing for HiFi color in accordance with the ICC, it will suffice to implement the conversion from machine independent color signals composed of three variables of L*a*b* or XYZ color space to image record signals including a solid color and black ink.

U.S. Pat. No. 4,812,899 describes an image forming apparatus adapted to perform color reproduction in 7-color process ink of YMCKRGB. In this image forming apparatus, color conversion from RGB signals of an input device such as a scanner to YMCKRGB of an output device such as a press is determined depending on UCR of achromatic component (black ink component) and chromatic component (RGB component), and a method called Kueppers Technique has been proposed. This is the first method proposed as color conversion processing for the HiFi color, and the algorithm is simple so that it is widely used.

When the application of the Kueppers Technique to color conversion in accordance with the ICC is considered, color signals of the machine independent color space such as L*a*b* color space are converted to RGB color signals by a publicly known 3-input 3-output color converting unit, and the RGB color signals are subjected to UCR processing by achromatic component and chromatic component, thereby implementing conversion from machine independent color signals to 5-color to 7-color image record signals including a solid color and black ink.

In the Kueppers Technique, however, although color conversion processing for the HiFi color in accordance with the ICC can be implemented, at the time of conversion from the machine dependent color space including a solid color and black ink such as YMCKOG color signals as input color signals to machine independent color signals of L*a*b* or XYZ color space, the solid color and black ink information of the input color signals is not retained. Consequently, encountered is the problem that the quantity of solid color and the quantity of black ink of output in conversion to image record signals including a solid color and black ink of the color printer are different from the quantity of solid color and the quantity of black ink of the input color signals.

As the color conversion processing for the HiFi color, a method called division method has been proposed. According to this method, the color gamut of the HiFi color is divided into color sub-gamuts formed by combination of three colors or four colors, and in each color sub-gamut, three or four image record signals in the color sub-gamut are determined from the machine independent color signals by the same method of the ordinary 3-color or 4-color printer in each color sub-gamut, thereby performing the conversion from the machine independent color signals to image record signals. Japanese Published Unexamined Patent Application No. 2000-32284 proposes a method of determining a coefficient of direct lookup table (hereinafter referred to as DLUT) for conversion processing from device independent color signals to image record signals including a solid color and black ink using sub-division color gamut formed by a combination of black ink and the other two colors having a close hue. Further, Japanese Published Unexamined Patent Application No. 2001-136401 proposes a method of determining a coefficient of DLUT for conversion processing from device independent color signals to image record signals including a solid color and black ink using a sub-division color gamut formed by a combination of black ink and the other three colors.

The division method, however, has the problem that although color conversion processing for the HiFi color in accordance with the ICC can be implemented, similarly to the case of Kueppers Technique, the solid color information and black ink information of the input color signals are not retained, so that the quantity of a solid color and the quantity of black ink of output are different from those of the input color signal.

SUMMARY OF THE INVENTION

The present invention has been made in view of the above circumstances and an aspect of the invention provides a color image processing method and a color image processor, which may make the quantity of a solid color and the quantity of black ink of HiFi color which is input conform with the quantity of a solid color and the quantity of black ink of color printer which is output as color conversion processing from input color signals including a solid color or further black ink to image record signals including a solid color or further black ink. Further, another aspect of the invention provides a color image processing method and a color image processor, which may implement high-accuracy color conversion by securing colorimetric color reproduction in the input and output. Further, another aspect of the invention provides a storage medium storing a program for performing the above color image processing method by a computer.

According to an embodiment of the present invention, a color image processing method, which is adapted to convert a first color signal including a solid color signal to a second color signal including a solid color signal, includes: determining a device independent color signal on a color coordinate in a color system from the first color signal; determining a solid color signal of the second color signal having the minimum or substantially minimum color difference from the solid color signal of the first color signal; and determining a color signal other than the solid color signal of the second color signal to be calorimetrically equal to the device independent color signal from the device independent color signal and the solid color signal of the second color signal.

BRIEF DESCRIPTION OF THE DRAWINGS

Some embodiments of the present invention will be described in detail based on the following figures, wherein:

FIG. 5 is a block diagram showing a second embodiment of a color conversion part;

FIG. 6 is a flowchart showing an example of determination processing of a color conversion parameter of DLUT color conversion part 51 in the second embodiment of a color conversion part 24.

DETAILED DESCRIPTION OF THE INVENTION

Figure 1:
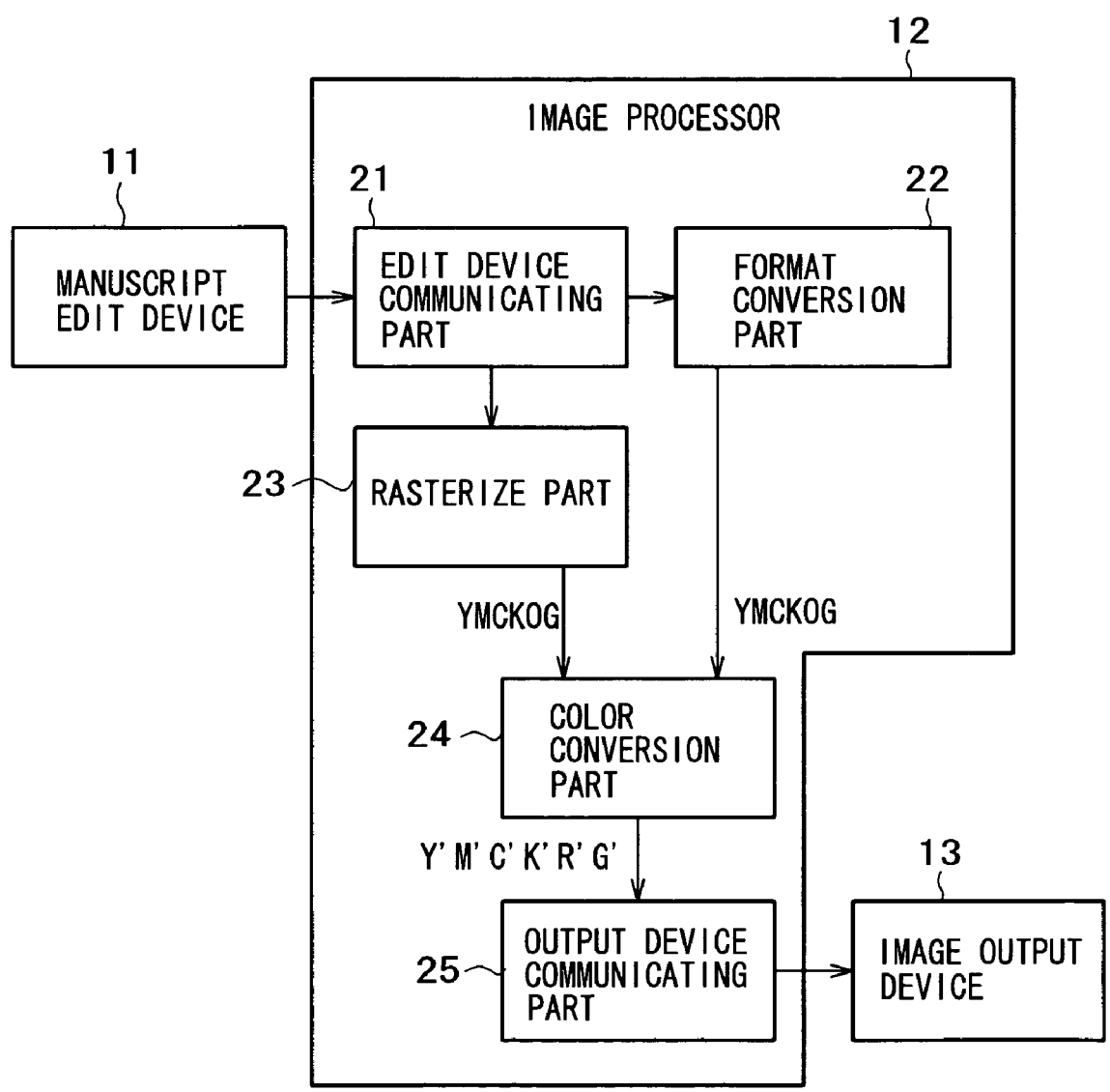
FIG. 1 is a block diagram showing an example of color DTP system using a color image processor of the invention.

FIG. 1 is a block diagram showing an example of a color DTP system using a color image processor of the invention. In FIG. 1, the reference numeral 11 is a manuscript edit device, 12 is an image processor, 13 is an image output device, 21 is an edit device communicating part, 22 is a format conversion part, 23 is a rasterize part, 24 is a color conversion part, and 25 is an output device communicating part. First, the color DTP system is taken up as an example of system to which the color image processor of the invention is applied, and the configuration example will be described.

The color DTP system shown in FIG. 1 is constituted of the manuscript edit device 11, the image processor 12 and the image output device 13 as a whole. The manuscript edit device 11 is a device for creating an electronic print manuscript, which is adapted to output electronic manuscript data such as page description language and raster image data to the image processor 12. To be concrete, as the manuscript edit device 11, in some cases, a manuscript is edited on a general purpose computer such as a personal computer by various DTP applications and in some cases, a manuscript is edited by a dedicated purpose computer.

In the case of using the general purpose computer, an electronic manuscript is edited by various DTP software. The created electronic manuscript is converted to PostScript (registered trade mark), which is page description language, by Adobe Corporation's PostScript (registered trade mark) printer driver, and output to the image processor 12 by network such as Ethernet (registered trade mark). It will be apparent that the page description language in delivery from the personal computer for DTP to the image processor 12 is not limited to PostScript (registered trade mark), but any page description language will suffice.

In the case of using the dedicated purpose computer, an electronic manuscript can be edited by dedicated purpose workstation called Color Electric Prepress System (CEPS) and application. The created electronic manuscript is output in the format of raster information such as TIFF/IT format, which is the standard of the raster image data and Scitex format widely spread as electronic data for printing to the image processor 12 by a network such as Ethernet (registered trade mark). Of course, it will be apparent that raster information delivered from the CEPS to the image processor 12 is not limited to TIFF/IT, and any image format may be used if image data is of a raster format.

As a color signal in an electronic manuscript, in the color DTP, generally a press printer is assumed as an output device, and in the case of HiFi color printing, in addition to YMCK color signals used in the ordinary process color printing, one to three colors such as red, green and blue are used as solid colors to represent an electronic manuscript in five to seven colors in total. The following description deals with the case of YMCKOG color signals where as a color signal on the electronic manuscript, hexachrome printing, which is a kind of HiFi color printing, is taken up, orange and green are added to YMCK color signals to perform color reproduction in six colors. Needless to say, it will be apparent that including a solid color and black ink, any color signal will suffice.

The image processor 12 includes the edit device communicating part 21, the format conversion part 22, the rasterize part 23, the color conversion part 24 and the output device communication part 25, wherein an electronic manuscript formed of code information and raster information input from the manuscript edit device 11 is converted to a form to be output by the image output device 13 and output to the image output device 13.

The electronic manuscript specified by color signals YMCKOG and YMCKRGB transmitted from the manuscript edit device 11 is received through a network such as LAN by the edit device communicating part 21, and transferred to the format conversion part 22 and the rasterize part 23. The page description language is converted by the rasterize part 23 to a raster format image data to be output by the image output device 13. The raster form image data like TIFF/IT is subjected to resolution conversion and format conversion in the format conversion part 22, and converted to the raster form image data to be output by the image output device 13.

The YMCKOG color signals transferred from the rasterize part 23 and the format conversion part 22 are converted by the color conversion part 24 to image record signals of 5-color to 7-color HiFi color, in which at least one of red, green and blue is added to yellow, magenta, cyan and black ink as image record signals of the image output device 13. In the following description, as concrete examples of solid colors, two colors, red and green are assumed, and it is assumed that the above transferred color signals are converted to image record signals of six colors Y'C'K'R'G' using red and green with yellow, magenta, cyan and black ink. It goes without saying that solid colors to be used are not limited to red and green.

The image record signals color-converted in the color conversion part 24 are transferred to the output device communicating part 25. In the output device communicating part 25, the image record signals, which have been subjected to the processing to the color conversion part 24, are stored, and suitably transferred to the image output device 13, thereby absorbing a difference in processing speed between the image processor 12 and the image output device 13. In the image output device 13, according to the raster form image record signals of six colors Y'M'C'K'R'G', an image is formed on paper.

As the image output device 13, any device will suffice as long as it records an image according to the image record signals including a solid color and black ink in YMC color signals. Any image output device will suffice as long as they are color image output devices such as an electrophotographic color printer, press, and ink jet, thermal transfer and silver-salt photographic types.

Figure 2:
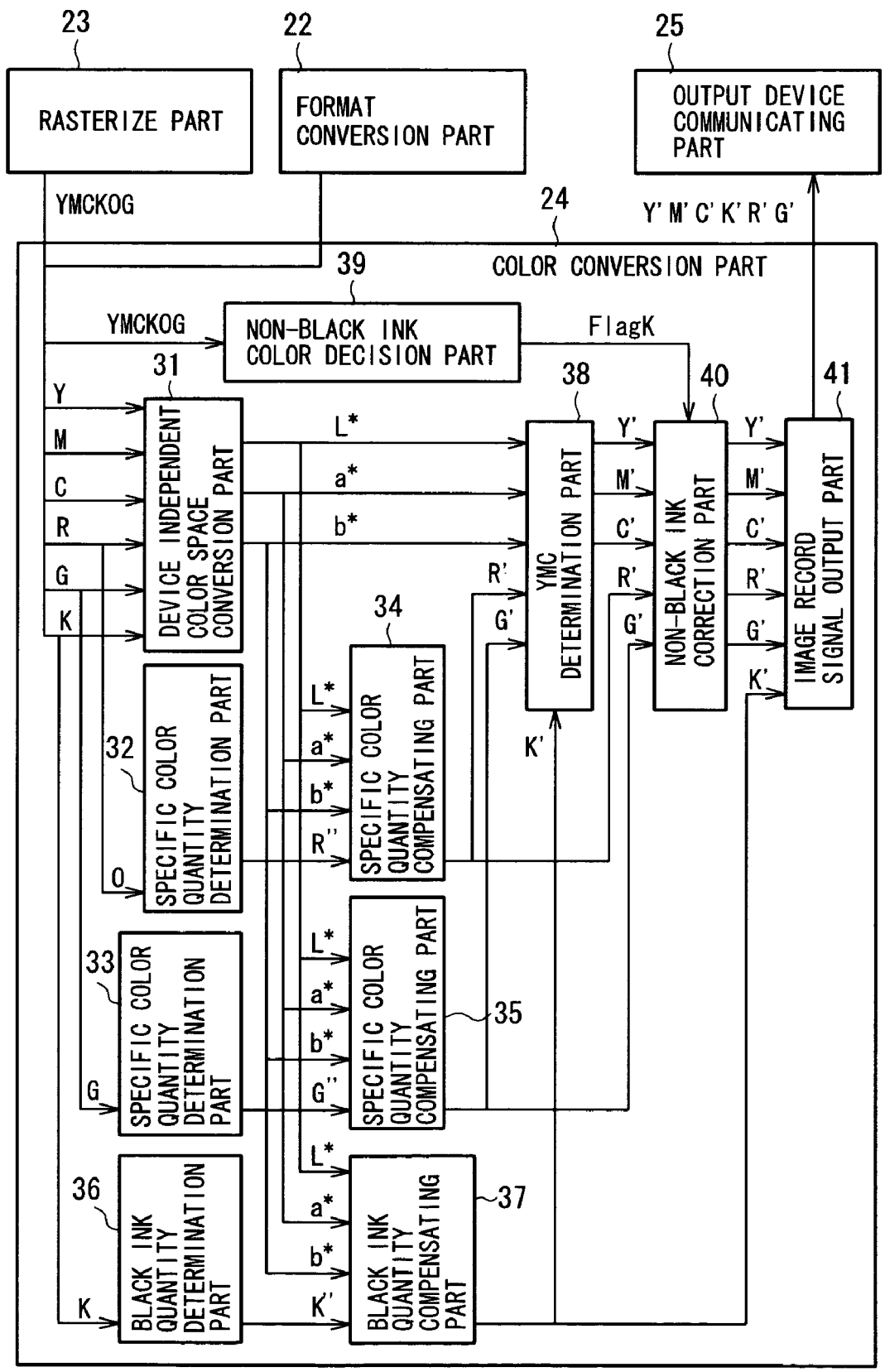
FIG. 2 is a block diagram showing a first embodiment of a color conversion part.

The color conversion part 24 implementing the color image processor of the invention or the color image processing method of the invention will now be described. FIG. 2 is a block diagram showing a first embodiment of the color conversion part. In FIG. 2, the reference numeral 31 is a device independent color space conversion part, 32 and 33 are solid color quantity determination parts, 34 and 35 are solid color quantity compensating parts, 36 is an black ink quantity determination part, 37 is an black ink quantity compensating part, 38 is a YMC determination part, 39 is a non-black ink color determination part, 40 is a non-black ink color correction part, and 41 is an image record signal output part.

The YMCKOG color signals transferred from the rasterize part 23 and the format conversion part 22 to the color conversion part 24 are input to the device independent color space conversion part 31, the solid color quantity determination part 32, the solid color quantity determination part 33, the black ink quantity determination part 36 and the non-black ink color determination part 39. In the device independent color space conversion part 31, the L*a*b* color signals of the device independent color space are determined from the input YMCKOG color signals and transferred to the YMC determination part 38, the solid color quantity compensating part 34, the solid color quantity compensating part 35 and the black ink quantity compensating part 37.

In the solid color determination part 32, the solid color quantity R" color signal of the image output device 13 having the minimum or substantially minimum color difference from the solid color quantity O signal input from the rasterize part 23 and the format conversion part 22 is determined and transferred to the solid color quantity compensating part 34. In the solid color quantity determination part 33, the solid color quantity G" color signal of the image output device 13 having the minimum or substantially minimum color difference from the solid color quantity G signal input from the rasterize part 23 and the format conversion part 22 is determined and transferred to the solid color quantity compensating part 35.

By the solid color quantity determination parts 32, 33, the solid color quantity of the input color signals is retained as much as possible to determine the solid color quantity of the image output device 13. In such determination of the solid color quantity, sometimes as in the solid color quantity determination part 32, the solid color of the input color signal is similar to the solid color used in the image output device 13, but they are different colors, and sometimes as in the solid color quantity determination part 33, the solid color of the input color signal is the same as the solid color used in the image output device 13. In the case where the solid colors are different, the input color signal cannot be used as it is, so the conversion is performed. On the other hand, even in the case where the solid colors of the input and the output are the same, frequently a difference in color development is found between the coloring material of the solid color used in the supposed image output device in which the input color signal is used and the coloring material of the solid color used in the image output device 13, and conversion processing for absorbing such difference is conducted so as to more favorably retain the solid color quantity.

In the black ink quantity determination part 36, an black ink quantity K" color signal of the image output device 13 having the same or substantially same brightness as the black ink quantity K signal input from the rasterize part 23 and the format conversion part 22 is determined and transferred to the black ink quantity compensating part 37.

In the solid color quantity compensating part 34, according to the solid color quantity R" color signal input from the solid color quantity determination part 32 and the L*a*b* color signal determined by the device independent color space conversion part 31, when the input solid color quantity R" color signal exceeds the maximum value to be input in the color gamut, the solid color quantity R" color signal is corrected to the maximum value, and when it is smaller than the minimum value to be input, the solid color quantity R" color signal is corrected to the minimum value, and the corrected solid color quantity R' color signal is transferred to the YMC determination part 38 and the non-black ink color correcting part 40.

Similarly, in the solid color compensating part 35, according to the solid color quantity G" color signal input from the solid color quantity determination part 33 and the L*a*b* color signal determined by the device independent color space conversion part 31, when the input solid color quantity G" color signal exceeds the maximum value to be input in the color gamut, the solid color quantity G" color signal is corrected to the maximum value, and when it is smaller than the minimum value to be input, the solid color quantity G" color signal is corrected to the minimum value, and the corrected solid color quantity G' color signal is transferred to the YMC determination part 38 and the non-black ink color correcting part 40.

Further in the black ink quantity compensating part 37, according to the solid color quantity K" color signal input from the black ink quantity determination part 36 and the L*a*b* color signal determined by the device independent color space conversion part 31, when the input black ink color quantity K" color signal exceeds the maximum value to be input in the color gamut, the black ink quantity K" color signal is corrected to the maximum value, and when it is smaller than the minimum value to be input, the black ink quantity K" color signal is corrected to the minimum value, and the corrected black ink quantity K' color signal is transferred to the YMC determination part 38 and the image record signal output part 41.

The solid color quantity compensating parts 34, 35 and the black ink quantity compensating part 37 may not be provided if it is known that the solid color quantity determination parts 32, 33 and the black ink quantity determination part 36 is within the input enable range.

The YMC determination part 38 determines a Y'M'C' color signal of the second color signal to be colorimetrically equal to the L*a*b* color signal according to the L*a*b* color signal determined by the device independent color space conversion part 31, the solid color quantity R' color signal compensated by the solid color quantity compensating part 34, the solid color quantity G' color signal compensated by the solid color quantity compensating part 35 and the black ink quantity K' color signal compensated by the black ink quantity compensating part 37, and the obtained Y'M'C' color signal is transferred to the non-black ink color correcting part 40.

In the non-black ink color determination part 39, it is determined whether or not the input YMCOG color signals are all zero, that is, an image is black ink color only, and when all are zero, a determination signal FlagK is transferred to the non-black ink color correcting part 40.

The Y'M'C' color signal from the YMC determination part 38, the compensated solid color quantity R' color signal from the solid color quantity compensating part 34 and the compensated solid color quantity G' color signal from the solid color quantity compensating part 35 are respectively input to the non-black ink color correcting part 40, and when the determination signal FlagK is input from the non-black ink color determination part 39, the Y'M'C'R'G' color signals are corrected to zero, and transferred to the image record signal output part 41. If the determination FlagK is input from the non-black ink color determination part 39, the Y'M'C'R'G' color signals are transferred to the image record signal output part 41 as they are.

The non-black ink color determination part 39 and the non-black ink color correcting part 40 are provided for reproducing an image of an input color signal as an image of black ink color only when the image of the input color signal is the black ink color image, and if not necessary, the parts may be omitted.

The image record signal output part 41 transfers the Y'M'C'R'G' color signals input from the non-black ink color correcting part 40 and the K' color signal input from the black ink quantity compensating part 37 to the output device communicating part 25. Thus, the color conversion processing is completed by the color conversion part 24.

It will be apparent that in the case where black ink is not included in the input and output color signals, the black ink quantity determination part 36, the black ink quantity compensating part 37, the non-black ink color determination part 39 and the non-black ink color correcting part 40 may be omitted from the configuration of the color conversion part 24 shown in FIG. 2, and the YMC determination part 38 may determine the Y'M'C' color signals only from the L*a*b* color signal and the solid color quantity.

The processing in each of the parts will now be described concretely. First, as the device independent color space conversion part 31, it is possible to use a matrix operation type color conversion circuit widely used as a color conversion circuit, a direct lookup table type color conversion circuit and a neural network type color conversion circuit, and in this example, a 6-input 3-output neural network type color conversion circuit can be used.

A color conversion parameter of the device independent color space conversion part 31 is determined by a method shown in the following. First, a color chip of a print to a combination of arbitrary YMCKO color signals of hexachrome printing input from the manuscript edit device 11 is output, the colorimetric values (L*a*b*) are measured by a calorimeter on the market to obtain the colorimetric values (L*a*b*) of printing to the input YMCKOG color signals, and the conversion characteristic of the calorimetric values (L*a*b*) to the input data (YMCKOG) is modeled (hereinafter referred to as color conversion model). In the color conversion model, a higher-order polynomial equation and a neural network are used. For example, a combination of YMCKOG data and L*a*b* data is learnt by the neural network, and modeling of the color characteristic of input hexachrome printing is performed. As the device independent color space conversion part 31, the obtained neural network can be used intact for the color conversion.

As the neural network used in here, the neural network shown in the literature "An Accurate Color Transformation Algorithm based on Flexible GCR (2) Accurate Printer Model by Neural Network" by K. Murai et al. on page 181 to 184 of JAPAN HARDCOPY '94 collection is used, and learning can be performed by back propagation method. Although the image record signals in this literature are four colors YMCK, the number of cells in the first layer in the neural network is increased from four to six, whereby the image record signals can be used as a color conversion model for 6-color HiFi color. Needless to say, the neural network is used as the color conversion model as well as other polynomial models and conversion table type color conversion model can be applied.

As a combination of image record signals YMCKOG used in modeling the color characteristic of hexachrome printing, a combination of 5×5×5×5×5×5=15625 color chips, in which dot percentage of each color is at intervals of 25%, for example, are output by a printing press to perform colorimetry. In the colorimetry, for example, X-Rite 938 manufactured by X-Rite Corporation is used as a colorimeter, and the measurement on L*a*b* is made under the conditions that CIE standard illuminant is D50 and CIE standard observer is 2 degrees. Although the number of color chips used in measurement can be set to an arbitrary number, it is desirable to use a number of color chips as much as possible in order to heighten the accuracy of a color conversion model. As a color model used in measurement, L*a*b* color model which is a uniform color space is used in this case, but the other color models such as XYS color model may be used. It is, however, preferable to use the uniform color space because of evaluating a color difference in learning the neural network.

Further, it will be apparent that as the device independent color space conversion part 31, the input color signals are not limited to hexachrome printing using six color signals YMCKOG, but with HiFi color printing including a solid color and black ink, the number of solid colors and the colors are not restrictive and black ink may not be included. Even the six or more color signals can be converted to a device independent color space by a method similar to the above. In the case of inputting seven color signals, for example, it will be sufficient to apply the 7-input 3-output neural network to the device independent color space conversion part 31.

As the solid color determination part 32, one-dimensional lookup table is used to convert the input signal to R" color signal of the image output device 13 having the minimum color difference from the input O color signal of HiFi color printing. An example of creating a lookup table is as follows. Concerning the hexachrome printing and the image output device 13, dot percentage is quantized in 8-bits, and the respective dot percentages are varied from 0 to 255 to measure L*a*b*. After that, the value of the output solid color quantity R" having the minimum color difference is obtained from the colorimetric value L*a*b* at the time of input solid color quantity O and set as the value of the lookup table. The solid color quantity determination part 33 can be also constituted by the similar method.

The black ink quantity determination part 36 is so constructed that one dimensional lookup table is used to convert the input print K signal to K" signal of the image output device 13 having the equivalent brightness. An example of creating the lookup table is as follows. Concerning the hexachrome printing and the image output device 13, dot percentage is quantized in 8 bits, and the respective dot percentages are varied from 0 to 255 to measure the brightness L*. After that, the value of the output black ink quantity K" having the same brightness is obtained from the brightness L* at the time of input black ink quantity K and set as the value of the lookup table.

According to the invention, in order to determine the solid color quantity and black ink quantity of input and output at high speed and with high accuracy, one-dimensional lookup table is used in the solid color quantity determination part 32, the solid color quantity determination part 33 and the black ink quantity determination part 36. However, this is not restrictive, but a functional expression or any other may be used if it can describe one-dimensional input-output relationship such as a functional expression. Further it will be apparent that the number of quantizing partitions of the lookup table is not limited to 8 bits. Although the conversion characteristic of the black ink quantity determination part 36 is set so that the brightness of the black ink quantity is made conformable between the input and the output, the conversion characteristic may be set so that the density of black ink quantity is made conformable between the input and the output. Further, although it is desirable that the brightness and density of black ink quantity are made conformable between the input and the output, even if they may not be completely conformable, the conversion characteristic may be set to attain the substantially equal brightness and density. Concerning the solid color quantity of the input and the output, it is desirable to minimize a color difference, but even if it is not completely minimized, the conversion characteristic may be set to attain the substantially minimize color difference.

The method of creating a color conversion model of the image output device 13 used in the solid color quantity compensating parts 34, 35, the black ink quantity compensating part 36 and the YMC determination part 38 mentioned in the next will now be described. First, a color patch to an arbitrary combination of image record signals Y' M' C' K' R' G' of the image output device 13 is printed out by the image output device 13, and the colorimetric values L*a*b* at that time are measured by a calorimeter.

To be concrete, as a combination of image record signals Y' M' C' K' R' G', patches in which dot percentage of each color is at intervals of 25%, that is, 5×5×5×5×5×5=15625 patch combinations are printed out by the image output device 13, and X-Rite 938 which is a calorimeter manufactured by X-Rite Corp. is used as a calorimeter. L*a*b* are measured on the measurement condition=D50 and2 degrees to find the pairs of Y' M' C' K' R' G' and calorimetric values L*a*b.

Although an arbitrary number of color patches can be used in measurement, it is desirable to use a large number of patches as much as possible in order to heighten the accuracy. Although L*a*b* color model which is uniform color space is used as a color model used in the measurement, the other color models such as XYZ color model may be used. The uniform color space is preferable because color difference is evaluated in solving the color conversion model.

The data set of the two or more obtained colorimetric values L*a*b* are learnt by a neural network as supervise data. The relationship between the image record signals Y' M' C' K' R' G' and the colorimetric values L*a*b* can be represented by the following functions.

$$(L^*, a^*, b^*) = F(Y', M', C', K', R', G') \quad (1)$$

The formula (1) is resolved into the respective color components as follows.

$$L^* = FL(Y', M', C', K', R', G') \quad (2)$$

$$a^* = Fa(Y', M', C', K', R', G') \quad (3)$$

$$b^* = Fb(Y', M', C', K', R', G') \quad (4)$$

In this case, as a neural network used as a color conversion model, the neural network shown in the literature "An Accurate Color Transformation Algorithm based on Flexible GCR (2) Accurate Printer Model by Neural Network" by K. Murai et al. on page 181 to 184 of JAPAN HARDCOPY '94 collection has been used to perform learning according to the back propagation method. Although the image record signals in the above literature are four colors YMCK, the number of cells in the first layer in the neural network is increased from four to six, whereby the image record signals can be used as a color conversion model for 6-color HiFi color. Although the neural network is used as the color conversion model in the above description, other polynomial models and conversion table type color conversion model can also be applied.

Normally the inverse function of the equation (1) as the color conversion model cannot be found. However, when the device independent L*a*b* color signal is given to suitably determine three variables in the image record signals Y' M' C' K' R' G', the other three variables can be found from the equation (1). For example, when K' and R', G' color signals are given, Y' M' C' color signals can be determined. In this case, when the color to be reproduced is taken as L*a*b*, the given black ink quantity is K' and the solid color quantity is R' and G', a color difference ΔE*ab among the color to be reproduced, the image record signal Y' M' C' color signal and the color when the black ink quantity is K' and the solid color quantity is R',G' is defined in the following formula as a function of the image record signal Y' M' C' color signal.

$$\Delta E^* ab(Y', M', C') = ((L^* - FL(Y', M', C', K', R', G'))^2 + \quad (5)$$
$$(a^* - Fa(Y', M', C', K', R', G'))^2 +$$
$$(b^* - Fb(Y', M', C', K', R', G'))^2)^{1/2}$$

To solve the formula (1) which is a nonlinear equation is to find the values of Y'M'C' color signal so that the color difference ΔE*ab is zero, so a problem of solving the equation (1) can be taken as a non-linear optimization problem of finding a Y' M' C' color signal to minimize an objective function ΔE*ab by taking the color difference ΔE*ab as an objective function. Accordingly, the equation (1) can be solved by nonlinear-optimization such as a simplex method. Concerning the simplex method, the algorithm is introduced on page 284 to 287 of the "NONLINEAR PROGRAMMING" written by Hiroshi Konno et al. and published by NIKKA GIREN Publishing Company. The simplex method is suitable for optimizing this type of multivariable function, and the optimum value can be found at high speed by the method.

Although the simplex method capable of optimizing multivariable function at high speed is applied as the non-linear optimization, any method may be applied as long as it is non-linear optimization, and other non-linear optimization such as bisection method and golden selection search method may be applied. The numerical solution for non-linear equation such as Newton's method may be applied to solve the color conversion model.

As described above, the color conversion model is solved to determine from the L*a*b* color signal, the black ink quantity K' and solid color quantity R, G' that the black ink quantity is K' color signal and the solid color quantity is R'G' in the image output device 13, and also the other three colors Y'M'C' color signals of the image output device 13 are determined to be calorimetrically conformable to the input L*a*b*. Since the above color conversion model is constituted without partitioning the color gamut of the image output device 13, the discontinuity of a color separation result in the partitioned color gamut boundary part, which is a problem in the division method as the related art, is not caused in theory, so that the smooth gradation without pseudo contour can be represented.

In the solid color quantity compensating part 34, in the case where the solid color quantity R" of the image output device 13 determined by the solid color quantity determination part 32 so that a color difference from the solid color quantity O of an input color signal is minimized reproduces an L*a*b* color signal input from the device independent color space conversion part 31, it is determined whether or not the value is reproducible in the color gamut of the image output device 13. According to the determination, when the solid color quantity R" is larger than the maximum reproducible value (hereinafter referred to as the maximum solid color quantity maxR), the solid color quantity R" is corrected to the maximum value. When it is smaller than the minimum reproducible value (hereinafter referred to as the minimum black ink quantity minR), the solid color quantity R" is corrected to the minimum value. The corrected value is transferred as the solid color quantity R' to the YMC determination part 38 and the non-black ink color correcting part 40. In the case where the solid color quantity R" is intermediate between the maximum solid color quantity maxR and the minimum solid color quantity minR, it is transferred intact as the solid color quantity R'.

The maximum solid color quantity maxR and the minimum solid color quantity minR in the solid color compensating part 34 can be determined by the following method. First, in the equation (1), which is the color conversion model of the image output device 13, G' signal as the solid color quantity and K' signal as the black ink quantity are set to zero, so that the equation (1) becomes equivalent to the color conversion model in the four-color Y' M' C' R' image forming apparatus. Accordingly, the L*a*b* color signal input from the device independent color space conversion part 31 is input to the color conversion model equation (1), and when the solid color quantity R' is given, the Y' M' C' color signals of the other three variables can be determined.

In solving the color conversion model, a color difference $\Delta E^*ab$ between the color reproduction by a combination of Y' M' C' color signals and R' signal and the L*a*b* color signal input from the device independent color space conversion part 31 is obtained from the equation (5). In that case, the largest solid color quantity R' satisfying the condition that the color difference $\Delta E^*ab$ is zero is the maximum solid color quantity maxR, and the smallest solid color quantity R' is the minimum solid color quantity minR. Accordingly, the solid color quantity R' of the equation (1) can be varied by the numerical solution such as binary search to find the maximum solid color quantity maxR and the minimum solid color quantity minR to zero the color difference $\Delta E^*ab$.

Thus, the solid color quantity R" signal determined by the solid color quantity determination part 32 is compensated to a value ranging from the maximum solid color quantity maxR to the minimum solid color quantity minR, whereby in the case of reproducing the L*a*b* input from the device independent color space conversion part 31, it is ensured that the solid color quantity R' is a value reproducible in the color gamut of the image output device 13, so that high color conversion accuracy can be implemented. Thus, when the G' signal as the solid color quantity and K' signal as the black ink quantity are set to zero, the maximum solid color quantity maxR and the minimum solid color quantity minR can be efficiently determined.

Needless to say, in addition to the above method, it will be apparent that in order to determine a more accurate maximum solid color quantity and a more accurate minimum solid color quantity, the maximum black ink quantity maxR and the minimum black ink quantity minR in the color gamut of six colors Y' M' C' K' R' G' of the image output device 13 may be calculated. In this case, in addition to the solid color quantity R' of the equation (1), the solid color quantity G' and the black ink quantity K' are added to vary the value, and the maximum value and the minimum value of the solid color quantity R' to zero the color difference $\Delta E^*ab$ may be determined.

Thus, in the solid color quantity compensating part 34, the solid color quantity R' is compensated in the range from the maximum solid color quantity to the minimum solid color quantity, whereby high color conversion accuracy can be implemented. The compensation of solid color quantity depending on the maximum solid color quantity will suffice, and the compensation depending on the minimum solid color may not be performed. Thus, in the case where a solid color signal is not existent in the input color signal, the solid color signal of the output can be surely made zero. When the conformity in solid color quantity between the input and the output is given priority, the compensating processing is not performed by the solid color quantity compensating part 34, but the solid color quantity R" determined by the solid color quantity determination part 32 may be directly input to the YMC determination part 38 and the non-black ink color correcting part 40.

Also in the solid color compensating part 35, by the method similar to that of the solid color quantity compensating part 34, the solid color quantity G" can be compensated to be a value ranging from the maximum solid color quantity to the minimum solid color quantity.

In the black ink quantity compensating part 37, in the case where the black ink quantity K" of the image output device 13 determined to attain the brightness equal to that of the black ink quantity K of the input color signal by the black ink quantity determination part 36 reproduces L*a*b* color signal input from the device independent color space conversion part 31, it is determined whether or not the value is reproducible in the color gamut of the image output device 13. At the time, in the case where the black ink quantity K" is larger than the maximum value of reproducible values (hereinafter referred to as the maximum black ink quantity maxK), the black ink quantity K" is corrected to the maximum value. In the case where it is smaller than the minimum value of reproducible values (hereinafter referred to as the minimum black ink quantity minK), the black ink quantity K" is corrected to the minimum value. The corrected value is transferred as the black ink quantity K' to the YMC determination part 38 and the image record signal output part 41.

The maximum black ink quantity maxK and the minimum black ink quantity minK in the black ink quantity compensating part 37 are determined by the following method. First, in the equation (1) as the color conversion model of the image output device 13, the solid color quantity R' signal and G' signal are set to zero, whereby the equation (1) becomes equivalent to the color conversion model in the four-color Y' M' C' K' image forming apparatus. Accordingly, the L*a*b* color signal input from the device independent color space conversion part 31 is input to the color conversion model equation (1), and when the black ink quantity K' is given, Y' M' C' color signals as the other three variables can be determined.

In solving the color conversion model, a color difference ΔE*ab between the color reproduction by a combination of Y' M' C' color signals and the input R' signal and the L*a*b* color signal input from the device independent color space conversion part 31 is obtained from the equation (5). At the time, the largest black ink quantity K' satisfying the condition that the color difference ΔE*ab is zero is the maximum black ink quantity maxK, and the smallest black ink quantity K' is the minimum black ink quantity minK. Accordingly, the black ink quantity K' of the equation (1) can be varied by the numerical solution such as binary search to find the maximum black ink quantity maxK and the minimum black ink quantity minK to zero the color difference ΔE*ab.

Thus, the black ink quantity K" signal determined by the black ink quantity determination part 32 is compensated to a value ranging from the maximum black ink quantity maxK to the minimum black ink quantity minK, whereby in the case of reproducing the L*a*b* input from the device independent color space conversion part 31, it is ensured that the black ink quantity K' is a value reproducible in the color gamut of the image output device 13, so that high color conversion accuracy can be implemented. Thus, when the R' signal and G' signal as the solid color quantity are set to zero, the maximum black ink quantity maxK and the minimum black ink quantity minK can be efficiently determined.

Needless to say, in addition to the above method, it will be apparent that in order to determine a more accurate maximum black ink quantity and a more accurate minimum black ink quantity, the maximum black ink quantity maxK and the minimum black ink quantity minK in the color gamut of six colors Y' M' C' K' R' G' of the image output device 13 may be calculated. In this case, in addition to the black ink quantity K' of the equation (1), the solid color quantity R' and G' are added to vary the value, and the maximum value and the minimum value of the black ink quantity to zero the color difference ΔE*ab may be determined.

Thus, in the black ink quantity compensating part 37, the black ink quantity K' is compensated in the range from the maximum black ink quantity to the minimum black ink quantity, whereby high color conversion accuracy can be implemented. The compensation of black ink quantity depending on the maximum black ink quantity will suffice, and the compensation depending on the minimum black ink quantity may not be performed. Thus, in the case where an black ink signal is not existent in the input color signal, the black ink signal of the output can be surely made zero. When the conformity in the brightness of black ink quantity between the input and the output is given priority, the compensating processing is not performed by the black ink quantity compensating part 37, and the black ink quantity K" determined by the black ink quantity determination part 36 may be directly input to the YMC determination part 38 and the image record signal output part 41.

Also in the YMC determination part 38, the color conversion model is solved by the above method to determine from the L*a*b* color signal obtained from the device independent color space conversion part 31, the solid color quantity R' obtained from the solid color compensating part 34, solid color quantity G' obtained from the solid color quantity compensating part 35 and the black ink quantity K' obtained from the black ink quantity compensating part 37 that the solid color quantity is R' and G' and the black ink quantity is K' in the image output device 13, and that the other three colors Y'M'C' color signals of the image output device 13 are determined to be calorimetrically conformable to the input L*a*b*. Thus, the colorimetric color reproduction can be ensured. Since the used color conversion model is constituted without partitioning the color gamut of the image output device 13, pseudo contour, which is a problem in the division method as the related art, will not be caused.

Subsequently, in the non-black ink color determination part 39, it is determined whether or not the input color signals of five colors YMCOG are zero at the same time, and a determination flag FlagK is transferred to the non-black ink color correcting part 40. In the non-black ink color correcting part 40, the color signals of Y' M' C' R' G' obtained in the YMC determination part 38 are all corrected to zero in the case where the determination flag FlagK is received from the non-black ink color determination part 39. Thus, the black characters and black fine lines represented by black ink only in the electronic manuscript can be represented by black ink color only, so that the reproducibility of the black characters and black fine lines can be remarkably improved. On the other hand, in a part of black ink color only in the input and the output, a difference in coloring material and a difference in image structure between the printing press and the image output device 13 will cause a little color difference due to correction to zero of Y' M' C' R' G' color signals in spite of conformity in brightness, but the level of such difference does not matter visually.

Although in the non-black ink color correcting part 40, as described above, the Y' M' C' R' G' color signals obtained in the YMC determination part 38 are all corrected to zero in the case where the determination flag FlagK is received from the non-black ink color determination part 39, in the case of more attaching importance to the color conformity accuracy between the input and the output, the correction processing for the Y' M' C' R' G' color signals may not be performed. In order to surely ensure the black ink color only reproduction of the black characters and black fine lines, however, it is desirable to conduct the correction processing for the Y' M' C' R' G' color signals in the non-black ink color correcting part 40 as described above.

Lastly, the Y' M' C' K' R' G' color signals which are image record signals input to the image output device 13 are transferred from the image record signal output part 41 to the output device communicating part 25 to thereby complete the color conversion processing in the color conversion part 24.

Figure 3A:
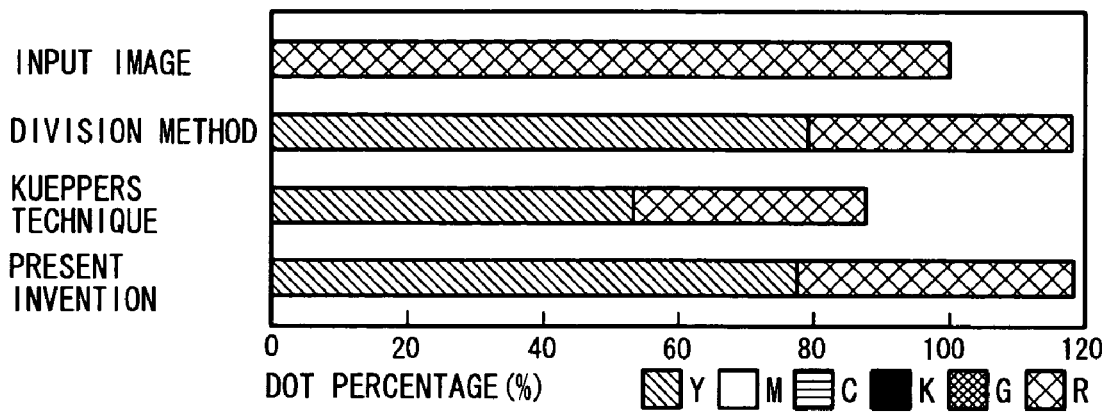
FIGS. 3A to 3C are diagrams for explaining the result of comparison in color conversion characteristic between the present invention and the related art.
Figure 3B:
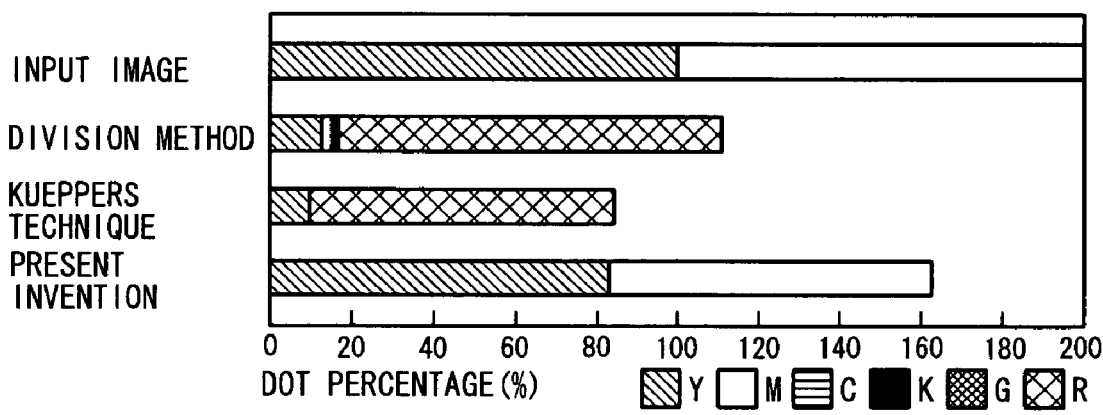
Figure 3C:
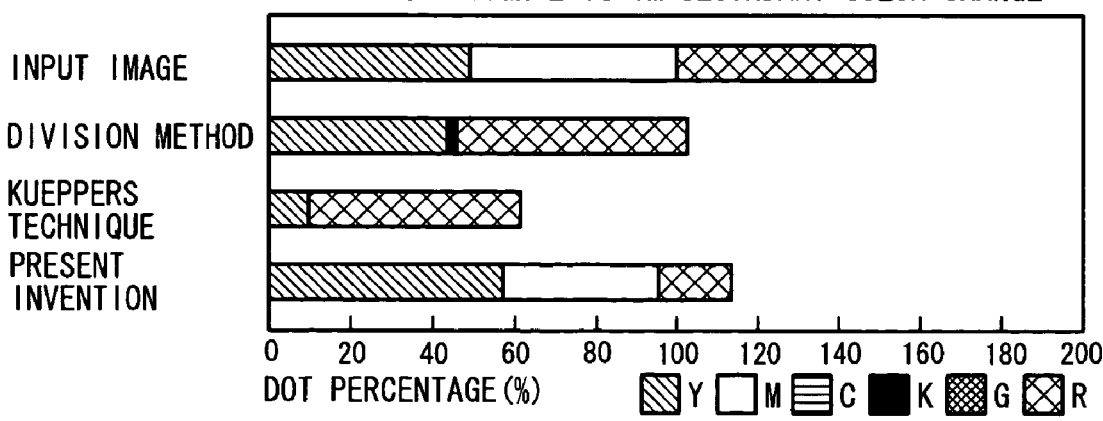
Figure 4A:
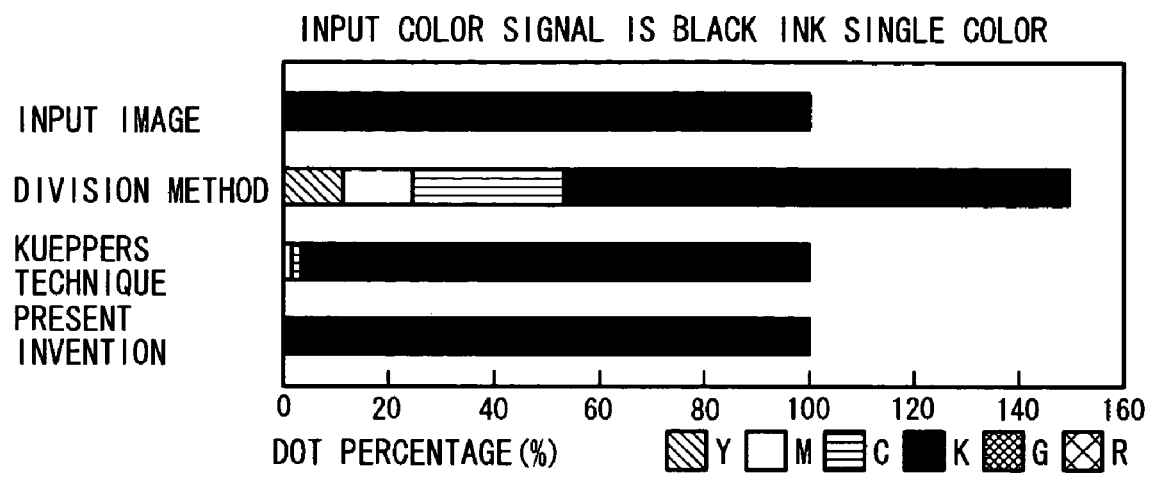
FIGS. 4A and 4B are diagrams (continued from FIGS. 3A and 3B) for explaining the result of comparison in color conversion characteristic between the present invention and the related art.
Figure 4B:
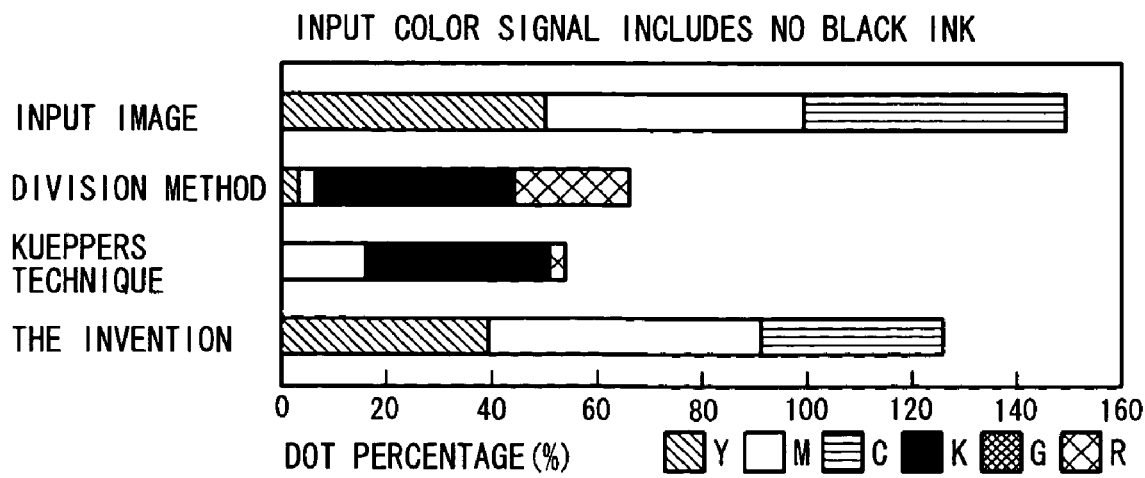

FIGS. 3A to 3C, 4A and 4B are diagrams for explaining the comparison results in color conversion characteristic between the invention and the related art. In order to verify the effectiveness of the invention, FIGS. 3A to 3C show the results of evaluation on the conformity in solid color quantity between the input and the output concerning the case where the color conversion part 24 is constituted as described above, the case of applying Kueppers Technique represented by U.S. Pat. No. 4,812,899 to the color conversion processing in accordance with ICC, and the case of applying the division method represented by Japanese Published Unexamined Patent Application No. 2001-136401, and FIGS. 4A and 4B show the results of evaluation on the black ink quantity conformity between the input and the output and black ink only reproduction concerning the same cases.

Concerning the configuration of the color conversion part 24 other than the present invention, in the case of conversion from the YMCKOG color signals of hexachrome printing to the device independent L*a*b* color signals, color conversion is performed by the publicly known 6-input 3-output DLUT in accordance with ICC, in the case of Kueppers Technique, conversion from L*a*b* color signals to RGB color signals is performed by the publicly known 3-input 3-output DLUT, and in the case of conversion from the RGB color signals to Y' M' C' K' R' G' color signals is performed by application of the embodiment in U.S. Pat. No. 4,812,899. Although UCR rate is not defined in the reference, it is considered that UCR functions of achromatic component and chromatic component are equivalent to 100% of constant ratio. With the division method, in the conversion from the L*a*b* color signals to the Y' M' C' K' R' G' color signals, in order to make the black ink and solid color use method close to U.S. Pat. No. 4,812,899, the conditions of max black (indicating the condition of the maximum black ink quantity) and max HFC (equivalent to the maximum solid color) in the embodiment of Japanese Published Unexamined Patent Application No. 2001-136401 are applied intact.

As an example of an input color signal corresponding to the solid color specify method, the case of representing reproduction of red in an electronic manuscript in the first color of solid color, the case of reproducing red in the second color of yellow and magenta, and the case of reproducing red in the third color where orange is added to the second color of yellow and magenta have been compared with each other. As an example of representing the reproduction of red in the electronic manuscript in the first color of solid color, the case where the input color signal is an orange single color (O is 100% and YMCKG is 0%) is taken and the color conversion result thereof is shown in FIG. 3A. As an example of reproducing red in the secondary color of yellow and magenta, the case where the input color signal is the secondary color of YM (YM is 100% and CKOG is 0%) is taken and the color conversion result thereof is shown in FIG. 3B. As an example of reproducing red in the third color where orange is added to the secondary color of yellow and magenta, the case where the input color signal is YM secondary color+orange (YM is 50% and O is 50%) is taken and the color conversion result thereof is shown in FIG. 3C.

As an example of an input color signal corresponding to the solid color specify method, as an example of black characters and black fine lines in the electronic manuscript, the case where the input color signal is an black ink single color (K is 100% and YMCOG is 0%) is taken and the color conversion result thereof is shown in FIG. 4A. As an example of from high brightness part to the medium brightness part in a natural drawing gray part in the electronic manuscript, the case where no black ink exists in the input color signal (YMC is 50% and KOG is 0%) is taken and the color conversion result thereof is shown in FIG. 4B.

As is known from FIG. 3A, in the case where the input color signal is orange single color which is a solid color, in the present invention, the division method as the related art, and Kueppers Technique, the substantially similar color separation results in which yellow is added to red which is a solid color corresponding to orange can be obtained. The reason why the color separation result is not red single color, and yellow is added is that orange of the hexachrome printing and red of the image output device 13 have different color reproducibility, and since a color difference is caused in the case of red only having the minimum color difference, yellow is needed to attain conformity of colorimetric color reproduction. According to the invention and the related art, as described above, it is considered that when the input color signal is a solid color single color, the solid color quantity in the input and the output can be retained.

As is known from FIG. 3B, however, in the case where a solid color is not included in the input color signal and the red is specified by the secondary color of yellow and magenta, according to the present invention, it is secondary color reproduction of yellow and magenta similarly to the input color signal, and no solid color is included. On the contrary, it is known that in the Kueppers Technique as the related art and the division method, red as a solid color is included.

Further, as is known from FIG. 3C, in the case of specifying the red of the input color signal in the third color where orange is added to the secondary color of yellow and magenta, according to the invention, the reproduction is performed in the third color of yellow, magenta and red similarly to the input color signal. On the contrary, in the Kueppers Technique as the related art and the division method, it is found that magenta is replaced by red to cause the second color reproduction of yellow and red. In the division method, it is found that black ink is just a little put thereon, so black ink not existing in the input color signal is added.

According to the invention, as described above, the solid color quantity in the input and the output is retained as much as possible, whereby reproduction can be performed in a combination of colors equal to the input color signal, so that color reproduction can be performed according to the editor' intention. On the contrary, in the related art, the solid color quantity in the input and the output is not retained, so that reproduction is performed in a combination of colors different from the editor's intention.

Further, as is known from FIG. 4A, according to the invention, in the case where the input color signal is black ink single color, the black ink quantity equal to that of an input image can be obtained so that reproduction can be performed in the black ink single color. On the contrary, in the division method as the related art, although the black ink quantity substantially equal to that of an input image can be obtained, it is impossible to reproduce in black ink single color. Further, also in the Kueppers Technique, although the black ink quantity substantially equal to that of an input image can be obtained, just a little M and C are put thereon, so it is impossible to reproduce in black ink single color.

According to the related art, as described above, in the case where the input color signal is a black ink single color, it is impossible to perform reproduction in a black ink single color. Consequently, in the related art, the quality of the black characters and black fine lines is deteriorated. According to the present invention, the black characters and the black fine lines can be reproduced in black single color so as to improve the image quality.

As is known from FIG. 4B, in the present invention, when black ink is not included in the input color signal, inking is not performed. On the contrary, in the Kueppers Technique and the division method as the related art, inking is performed so that the black ink quantity is quite different from that of the input image. As described above, in the related art, when black ink is not included in the input color signal, inking is performed unlike the editor's intention so that the graininess of the natural drawing is deteriorated. According to the invention, when black ink is not included in the input color signal, inking is not performed so that color reproduction can be performed according to the editor's intention, and the graininess of the natural drawing is not deteriorated.

As is known from FIG. 4B, in the invention, the solid color quantity and the black ink quantity in the input and the output can be retained so that reproduction is performed in three colors, yellow, magenta and cyan similarly to the input signal. On the contrary, in the related art, retention of solid color quantity and black ink quantity in the input and the output is not implemented, so that black ink and a solid color are added to perform reproduction in a combination of colors quite different from that of the input signal.

According to the invention, as described above, the L*a*b* color signal, which is the device independent color space on a color model color coordinate is obtained from the color signals of six colors YMCKOG specified by the document edit device 11, solid color quantity R" and G" signals to minimize a color difference from the input solid color signals O and G are determined, from the L*a*b* color signal, the solid color quantity R" and G" signals are compensated to the solid color quantity R' and G' to be input in the color gamut in the image output device 13. On the other hand, the black ink K" signal having the brightness equal to that of the input black ink signal K is determined, and from the L*a*b* color signal, the black ink quantity K" signal is compensated to the black ink quantity K' signal to be input in the color gamut in the image output device 13. From the input L*a*b* color signal, the solid color quantity R' G' signals and the black ink quantity K' color signal, Y' M' C' color signals are determined to be colorimetrically equal to the L*a*b* color signal, and in the case where the input color signals other than black ink are all zero, all of the Y', M', C', R', G' color signals are corrected to zero. Thus, calorimetric color reproduction is ensured to implement high-accuracy color conversion as well as the solid color quantity and black ink quantity of HiFi color printing as input can be made conformable or substantially conformable with the solid color quantity and black ink quantity of a color printer as output, whereby reproduction can be performed in a combination of colors equal to that of input color signals specified by the editor. Further, a part specified by black ink only on the electronic manuscript can be output in black ink only.

FIG. 5 is a block diagram showing a second embodiment of a color conversion part. In FIG. 5, the reference numeral 51 is DLUT color conversion part. The second embodiment of the color conversion part 24 shows an example in which the color conversion part 24 is constituted by the DLUT color conversion part 51 of 6-input and 7-output.

The DLUT color conversion part 51 takes YMCKOG color signals as input, and includes a six-dimensional direct lookup table (DLUT) for outputting Y' M' C' K' R' G' corresponding to the YMCKOG color signals. For example, in the six-dimensional DLUT, the values dividing each axis of the input YMCKOG color signals into 8 parts are taken as an input address, and interpolating operation is performed by the six-dimensional cubic interpolation to calculate Y' M' C' K' R' and d' color signals which are image record signals of the image output device 13. Needless to say, the interpolation system is not limited to the cubic interpolation system, but if it is a publicly known interpolation system, the other systems such as prism interpolation and tetrahedron interpolation may be applied. Further, it is clear that the number of divisions of each axis of input is not limited to eight divisions.

Although the color conversion part 24 is constituted by the six-dimensional direct lookup table in this case, this is not restrictive if color conversion of 6-input and 7-output can be performed, and the other color conversion systems such as a publicly-known color conversion system like a neural network may be applied. Further, it will be apparent that the color signal input to the color conversion part 24 is not limited to YMCKOG color signals of hexachrome printing, but YMCK-RGB color signals of HiFi color printing may be accepted if the color signal includes a solid color and black ink. As to the number of dimensions of the DLUT color conversion part 51, 7-dimensional DLUT is needed in the case where the input color signal is YMCKRGB color signals of HiFi color printing to be conformable to the number of input color signals.

FIG. 6 is a flowchart showing an example of color conversion parameter decision processing of the DLUT color conversion part 51 in the second embodiment of the color conversion part 24. The processing is substantially similar to the processing conducted in the respective parts in the first embodiment of the color conversion part 24.

First, in the step S61, a color chip to an arbitrary combination of YMCKOG color signals of hexachrome printing and image record signals Y'M'C'K'R'G' of the image output device 13 is printed out by hexachrome printing and the image output device 13, and the calorimetric value L*a*b* at the time is measured by the colorimeter. The combination of YMCKOG color signals of hexachrome printing and image record signals Y'M'C'K'R'G' of the image output device 13 and the calorimetric condition may be the same as that of the first embodiment.

In the step S62, the plural data sets of YMCKOG, Y'M'C'K'R'G' and L*a*b* obtained in the step S61 are taken as supervised data and learnt by the neural network 1 and the neural network 2 as a color conversion model, respectively. The neural network may be the same as that used in the first embodiment.

In the step S63, the L*a*b* color signal representing the colorimetric value to the input address value YMCKOG of the DLUT color conversion part 51 is determined by the neural network 1.

In the step S64, the solid color quantity R" and G" of the image output device 13 to have the minimum color difference from the input address values O and G related to the solid color of the DLUT color conversion part 51 is determined by the one-dimensional lookup table. The black ink quantity K" of the image output device 13 to have the equivalent brightness to the input address value K related to the black ink quantity is determined by the one-dimensional lookup table. The method of determining the one-dimensional lookup table for converting the solid color quantity and black ink quantity may also be similar to that of the first embodiment.

In the step S65, the L*a*b* color signal obtained in the step S63 is input to the neural network 2 to find the maximum value and minimum value of the solid color quantity and black ink quantity to be color-reproducible in the color gamut of the image output device 13, and when the solid color quantity R" G" and the black ink quantity K" obtained in the step S64 exceed the maximum value, they are corrected to the maximum value, and if smaller than the minimum value, they are corrected to the minimum value to determine the solid color quantity R'G' and black ink quantity K'. The method of determining the maximum value and the minimum value of the solid color quantity and the black ink quantity may also be similar to that of the first embodiment.

In the step S66, the L*a*b* color signal obtained in the step S63 and the solid color quantity R'G' and the black ink quantity K' obtained in the step S65 are input to the neural network 2 and solved by numerical solution to find colorimetrically conformable Y'M'C' color signal. The numerical solution for the Y'M'C' color signal may also be similar to that of the first embodiment.

In the step S67, in the case where the input address values YMCOG of the DLUT color conversion part 51 are all zero, the Y'M'C' color signal obtained in the step S66 and the solid color quantity R'G' obtained in the step S65 are all corrected to zero.

Lastly, in the step S68, the obtained Y'M'C'K'R'G' are set at the dots of the DLUT color conversion part 51, thereby determining the color conversion parameter of the DLUT color conversion part 51.

Thus, the color conversion parameter of the DLUT color conversion part 51 is previously determined. The values of Y'M'C'K'R'G' in dots 8-sectioning each axis of YMCKOG color signals of the input are set in the DLUT color conversion part 51. The actually input YMCKOG color signals are not limited to the dots, and arbitrary YMCKOG color signals are input. Accordingly, in conducting the color conversion processing, according to the input YMCKOG color signal, the addresses of one or two or more dots are generated to read out the values of Y'M'C'K'R'G', and interpolation processing is conducted to obtain Y'M'C'K'R'G' color signals corresponding to the input YMCKOG color signals.

According to the embodiment 2, as described above, the previously created direct lookup table is used to directly perform color conversion unlike the first embodiment in which the processing having a large amount of operation is not conducted at the time of the color conversion processing in the color conversion part 24, whereby color conversion can be implemented at very high speed. In the case of configuring the embodiment with hardware, the operation amount is very small so that the configuration can be simplified.

Figure 7:
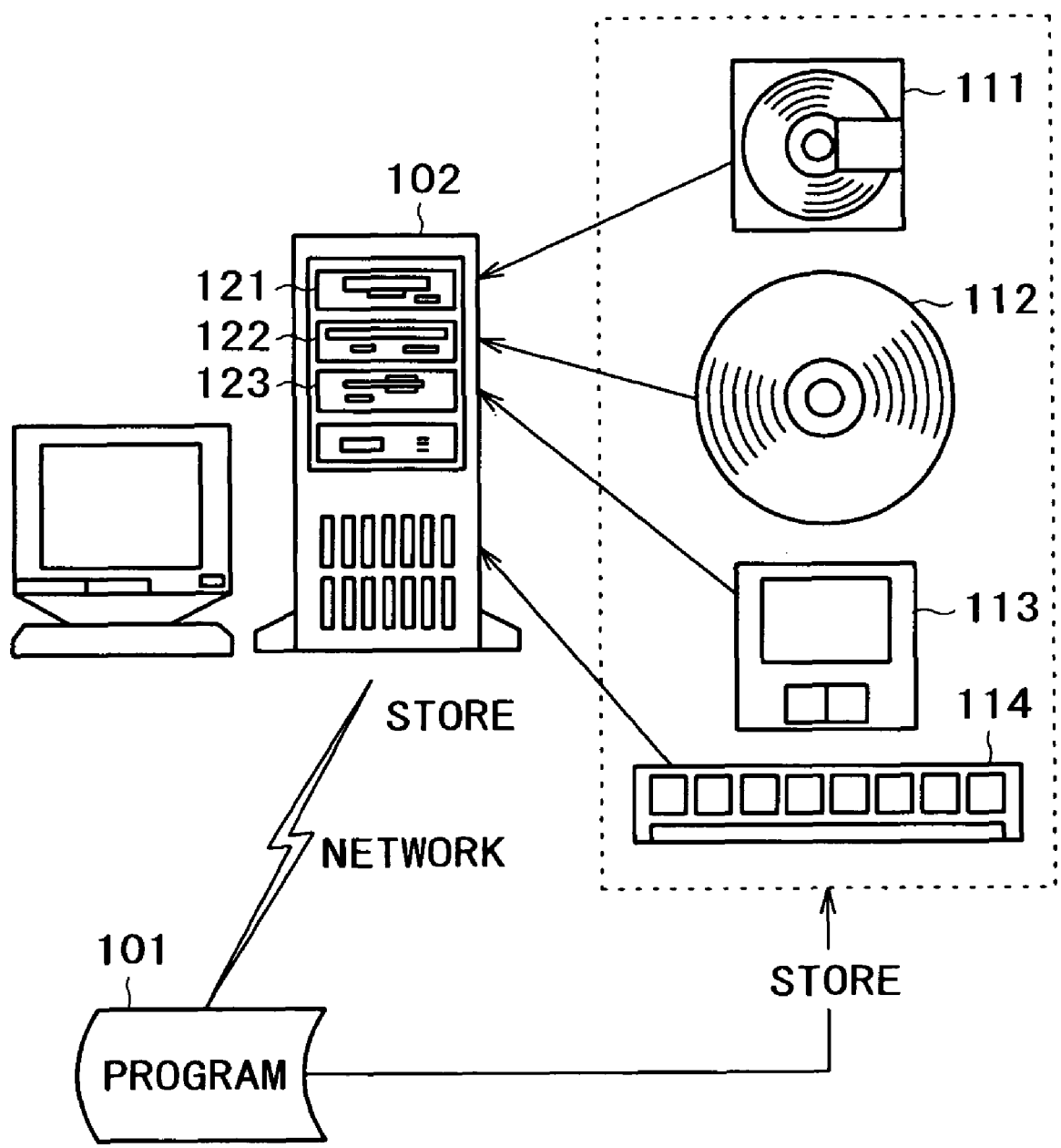
FIG. 7 is a diagram for explaining an example of a computer program and a storage medium storing the computer program in the case where a function of a color image processor or a color image processing method of the invention is implemented in a computer program.

FIG. 7 is a diagram for explaining an example of a computer program and a storage medium storing the computer program in the case of implementing the function of the color image processor or the color image processing method according to the invention in the computer program. In FIG. 7, the reference numeral 101 is a program, 102 is a computer, 111 is a magneto-optical disc, 112 is an optical disc, 113 is a magnetic disc, 114 is a memory, 121 is a magneto-optical disc device, 122 is an optical disc device, and 123 is a magnetic disc device.

The functions of the color conversion part 24 described in the respective embodiments, or a part or the whole of configuration of the image processor 12 other than the color conversion part 24 shown in FIG. 1 can be implemented by a computer executable program 101. In that case, the program 101 and the data used by the program can be stored in a computer readable storage medium. The storage medium is adapted to cause the change state of magnetic, optical or electric energy to a reader provided in the hardware resource of the computer according to the description contents of the program, thereby transmitting the description contents of the program to the reader in the corresponding signal form. As the storage medium, cited are the magneto-optical disc 111, the optical disc 112 (including CD and DVD), the magnetic disc 113, the memory 114 (including IC card and memory card) and the like. Needless to say, these storage media are not limited to portable types.

The program 101 is stored in these storage media, and these storage media are mounted in the magneto-optical disc device 121, the optical disc device 122, the magnetic disc device 123 or a memory slot not shown of the computer 102, whereby the program 101 is read out from the computer to execute the function of the image processor or the image processing method according to the invention. On the other hand, it may be accepted that the storage medium is previously mounted or contained in the computer 102, the program 101 is transferred to the computer 102 through the network and the like, and the program 101 is stored in the storage medium and executed.

Needless to say, some functions may be configured by hardware, or all may be configured by hardware. A program including the configuration of the document edit device 11 is configured, or one program may be configured with the control program in the image output device 13. In the case of application to the other uses, the function may be integrated with the program in those uses.

The order of execution of steps of the present invention is not limited to the order described in the above embodiments, and it may be changed as long as not deviated from the gist of the invention. Simultaneous execution of steps, change of order of execution of steps and a combination thereof may also be possible.

According to the embodiments of the present invention, the device independent color signal on a color model color coordinate is found from the first color signal including a solid color and black ink to determine a solid color signal of a second color signal having the minimum color difference from the solid color signal of the first color signal and determine an black ink signal of the second color signal having the brightness equal to that of the black ink signal of the first color signal, and a YMC color signal of the second color signal is determined from the determined device independent color and the solid color signal and black ink signal of the second color signal are determined to be calorimetrically equal to the device independent color signal. Thus, as the color conversion processing for the HiFi color, the colorimetric color reproduction can be implemented. Concurrently, the solid color quantity and the black ink quantity can be made conformable to each other in the input and the output, so the color can be reproduced by combination of colors equal to the input color signal specified by an editor.

Especially, in the case of applying the Kueppers Technique and division method as related art to the color conversion in accordance with the ICC, when YMCKOG color signals and YMCKRGB color signals which are the input color signals are converted from the device dependent color space to the device independent color signals of L*a*b* and XYZ color space, the solid color information and the black ink information of the input color signals are not retained, which causes the problem that when the input color signals are converted to the image record signals including a solid color and black ink of the color printer, the solid color quantity and the black ink quantity of the output are different from those of the input color signals so that the color reproduction is the combination of colors different from the color signals specified by the editor. According to the embodiments of the invention, a solid color of the second color signal having the minimum or substantially minimum color difference from the solid color signal of the first color signal as the input color signal is directly determined, so that the input and output can be made conformable to each other in the solid color quantity, and a print faithfully reproducing the solid color quantity specified by the editor creating an electronic manuscript can be obtained.

In the case where the first color signal and the second color signal include black ink, the similar processing can be conducted for the black ink signal. That is, from the black ink signal of the first color signal as the input color signal, an black ink signal of the second color signal having the same or substantially same brightness can be directly determined. Thus, the input and the output can be made conformable to each other in the black ink quantity so as to obtain a print faithfully reproducing the quantity of black ink specified by the editor creating an electronic manuscript.

Further, the solid color signal or further the black ink signal of the second color signal is corrected to the maximum value when it exceeds the maximum value to be input in the color gamut of the image output device, and corrected to the minimum value when it is smaller than the minimum value. Thus, color conversion with high accuracy can be implemented.

Further, in the case where the color signal other than the black ink in the first color signal is zero, the color signal other than black ink in the second color signal is set to zero, whereby a part specified by black ink only in the electronic manuscript can be output in black ink only so that good reproduction of the black characters and the black fine lines can be implemented.

Further, according to the embodiments of the invention, color conversion processing with a large amount of operation is performed in advance to determine a color conversion parameter of DLUT, and then color conversion can be performed directly by DLUT. Thus, in the actual color conversion processing, very high-speed color conversion can be implemented. In the case of implementing the embodiments of the invention in the hardware, the amount of operation is small so that the invention can be implemented by simplified hardware.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2003-417106 filed on Dec. 15, 2003 including specification, claims, drawings and abstract is incorporated herein by reference in its entirety.

What is claimed is:

1. A color image processing method, converting a first color signal including C, M, Y signals and a spot color signal to a second color signal including C, M, Y signals and a spot color signal, comprising:
   determining a device independent color signal on a color coordinate in a color system from the C, M, Y and the spot color signals of the first color signal;
   determining a spot color signal of the second color signal such that the spot color signal of the second color signal has a minimum or substantially minimum color difference from the spot color signal of the first color signal; and
   determining the C, M and Y signals of the second color signal such that the second color signal colorimetrically equal to the device independent color signal from the device independent color signal and the spot color signal of the second color signal;
   wherein the spot color signal in the first color signal and the second color signal is at least one selected from red, green and blue.

2. The color image processing method according to claim 1, further comprising:
   when the spot color signal of the second color signal exceeds the maximum value to be input in a color gamut, correcting the spot color signal of the second color signal to the maximum value, and when it is smaller than the minimum value to be input in the color gamut, correcting the spot color signal of the second color signal to the minimum value.

3. The color image processing method according to claim 1, wherein the spot color signal of the second color signal is determined with reference to a lookup table.

4. The color image processing method according to claim 1, further comprising:
   determining a black signal of the second color signal having the same or substantially the same brightness as that of the black signal of the first color signal when the first color signal includes the black signal, and the C, M and Y signals of the second color signal is determined such that the second color signal is colorimetrically equal to the device independent color signal based on the device independent color signal and both spot color signal and the black signal of the second color signal.

5. The color image processing method according to claim 4, further comprising:
   when a color signal other than the black signal in the first color signal is zero, setting a color signal other than black signal in the second color signal to zero.

6. The color image processing method according to claim 4, further comprising:
   when the black signal of the second color signal exceeds the maximum value to be input in the color gamut, correcting the black signal of the second color signal to the maximum value, and when it is smaller than the minimum value to be input in the color gamut, correcting the black signal of the second color signal to the minimum value.

7. The color image processing method according to claim 4, wherein the black signal of the second color signal is determined with reference to a lookup table.

8. The color image processing method according to claim 1, wherein a function of the second color signal and the device independent color signal on the color model color coordinate is found in advance, and the function is solved by taking the device independent color signal and the spot color signal of the second color signal or the spot color signal and the black signal as input to thereby determine the other color signal of the second color signal.

9. The color image processing method according to claim 1, wherein the device independent color signal on the color coordinate in a color system is an L*a*b* color signal.

10. A color image processor converting a first color signal including C, M, Y signals and a spot color signal to a second color signal including C, M, Y signals and a spot color signal, comprising:
    a device independent color signal conversion unit that determines a device independent color signal on a color coordinate in a color system from the C, M, Y signals and the spot color signal of the first color signal;
    a spot color quantity determination unit that determines the spot color signal of the second color signal such that the spot color signal of the second color signal has a minimum or substantially minimum color difference from the spot color signal of the first color signal; and
    a color determination unit that determines the C, M and Y signals of the second color signal such that the second color signal is colorimetrically equal to the device independent color signal based on the device independent color signal determined by the device independent color signal conversion unit and the spot color signal of the second color signal determined by the spot color quantity determining unit;
    wherein the spot color signal in the first color signal and the second color signal is at least one selected from red, green and blue.

11. The color image processor according to claim 10, further comprising:
    a spot color quantity compensating unit that corrects the spot color signal of the second color signal to the maximum value when the spot color signal of the second color signal determined by the spot color quantity determination means exceeds the maximum value to be input in a color gamut, and correcting the spot color signal of the second color signal to the minimum value when it is smaller than the minimum value to be input in the color gamut.

12. The color image processor according to claim 10, wherein the spot color quantity determination unit comprises a lookup table.

13. The color image processor according to claim 10, further comprising:
 a black color quantity determination that determines a black signal of the second color signal having the same or substantially the same brightness as that of a black signal of the first color signal when the first color signal includes the black signal,
 wherein the color determining unit determines the C, M and Y signals of the second color signal such that the second color signal is colorimetrically equal to the device independent color signal based on the device independent color signal, the spot color signal and the black signal of the second color signal.

14. The color image processor according to claim 13, further comprises:
 a non-black color quantity correcting unit that sets a color signal other than the black signal in the second color signal to zero when a color signal other than the black signal in the first color signal is zero.

15. The color image processor according to claim 13, further comprising:
 a black color quantity compensating unit that corrects the black signal of the second color signal to the maximum value when the black signal of the second color signal determined in the black color quantity determination unit exceeds the maximum value to be input in the color gamut, and correcting the black signal of the second color signal to the minimum value when it is smaller than the minimum value to be input in the color gamut.

16. The color image processor according to claim 13, wherein the black ink quantity determination unit comprises a lookup table.

17. The color image processor according to claim 10, wherein the color determination unit finds in advance a function of the second color signal and the device independent color signal on the color coordinate in a color system, and solves the function taking the device independent color signal and the spot color signal of the second color signal or the spot color signal and the black signal as input to thereby determine the C, M and Y signals of the second color signal.

18. The color image processor according to claim 10, wherein the device independent color signal on the color coordinate in a color system is an L*a*b* signal.

19. A color image processor, converting a first color signal including C, M, Y signals and a spot color signal to a second color signal including C, M, Y signals and a spot color signal, comprising:
 a device independent color signal conversion unit that determines a device independent color signal on a color coordinate in a color system from the C, M, Y signals and the spot color signal of the first color signal;
 a spot color quantity determination unit that determines the spot color signal of the second color signal such that the spot color signal of the second color signal has a minimum or substantially minimum color difference from the spot color signal of the first color signal;
 a color determination unit that determines the C, M and Y signals of the second color signal such that the second color signal is colorimetrically equal to the device independent color signal based on the device independent color signal determined by the device independent color signal conversion unit and the spot color signal of the second color signal determined by the spot color quantity determining unit; and
 color conversion means for converting an arbitrary first color signal to a second color signal by parameters set by pairs of a plurality of the first color signals and the second color signals obtained with respect to each of the first color signals;
 wherein the spot color signal in the first color signal and the second color signal is at least one selected from red, green and blue.

20. The color image processor according to claim 19, wherein the color conversion means comprises a direct lookup table having an interpolation function.

21. A storage medium readable by a computer, the storage medium storing a program of instructions executable by the computer to perform a function for converting a first color signal including C, M, Y signals and a spot color signal to a second color signal including C, M, Y signals and a spot color signal, the function comprising the steps of:
 determining a device independent color signal on a color coordinate in a color system from the C, M, Y signals and the spot color signal of the first color signal;
 determining a spot color signal of the second color signal having the minimum or substantially minimum color difference from the spot color signal of the first color signal; and
 determining the C, M and Y signals of the second color signal such that the second color signal is colorimetrically equal to the device independent color signal from the device independent color signal and the spot color signal of the second color signal;
 wherein the spot color signal in the first color signal and the second color signal is at least one selected from red, green and blue.

22. The color image processor according to claim 21, wherein
 the device independent color signal has an L*a*b* value or an XYZ value.

* * * * *